United States Patent
Hui et al.

(10) Patent No.: US 9,094,916 B1
(45) Date of Patent: Jul. 28, 2015

(54) SYSTEM AND METHOD FOR ADJUSTING POWER USED IN RECEPTION IN A WIRELESS PACKET NETWORK

(75) Inventors: Jonathan W. Hui, Foster City, CA (US); David E. Culler, Berkeley, CA (US)

(73) Assignee: Cisco Technology, Inc., San Jose, CA (US)

( * ) Notice: Subject to any disclaimer, the term of this patent is extended or adjusted under 35 U.S.C. 154(b) by 168 days.

(21) Appl. No.: 13/442,408

(22) Filed: Apr. 9, 2012

Related U.S. Application Data

(63) Continuation of application No. 12/004,125, filed on Dec. 19, 2007, now Pat. No. 8,175,073, which is a continuation-in-part of application No. 11/411,404, filed on Apr. 25, 2006, now Pat. No. 7,515,556, and a continuation-in-part of application No. 11/516,841, filed on Sep. 6, 2006, now abandoned.

(51) Int. Cl.
*H04W 52/02* (2009.01)
*H04L 12/00* (2006.01)

(52) U.S. Cl.
CPC ............ *H04W 52/0258* (2013.01); *H04L 12/00* (2013.01); *H04W 52/0248* (2013.01)

(58) Field of Classification Search
None
See application file for complete search history.

(56) References Cited

U.S. PATENT DOCUMENTS

| | | | |
|---|---|---|---|
| 5,574,748 A | 11/1996 | Vander Mey et al. | |
| 5,805,990 A | 9/1998 | Ohki | |
| 6,084,888 A | 7/2000 | Watanabe et al. | |
| 6,545,994 B2 | 4/2003 | Nelson et al. | |
| 6,563,427 B2 | 5/2003 | Bero et al. | |
| 6,819,908 B2 | 11/2004 | Spratt | |
| 6,889,067 B2 | 5/2005 | Willey | |
| 6,959,013 B1 | 10/2005 | Muller et al. | |
| 6,980,823 B2 | 12/2005 | Challa et al. | |
| 7,146,151 B2 | 12/2006 | Arimitsu | |
| 7,164,885 B2 | 1/2007 | Jonsson et al. | |
| 7,260,068 B2 | 8/2007 | Hsieh et al. | |
| 7,295,827 B2 | 11/2007 | Liu et al. | |
| 7,486,680 B1 * | 2/2009 | Zhang et al. | 370/395.4 |
| 7,489,674 B2 | 2/2009 | Kim | |
| 7,515,556 B2 | 4/2009 | Hui et al. | |
| 7,594,126 B2 | 9/2009 | Yun et al. | |
| 7,738,413 B2 | 6/2010 | Varaiya et al. | |
| 7,830,838 B2 | 11/2010 | Kohvakka et al. | |
| 7,986,652 B1 | 7/2011 | Hui et al. | |
| 7,991,905 B1 * | 8/2011 | Roussos et al. | 709/231 |
| 8,009,602 B2 | 8/2011 | Hui et al. | |
| 8,175,073 B1 | 5/2012 | Hui et al. | |
| 8,270,329 B2 | 9/2012 | Hui et al. | |
| 2002/0176391 A1 | 11/2002 | Hermann et al. | |
| 2002/0196769 A1 | 12/2002 | Ohmi et al. | |
| 2003/0144042 A1 | 7/2003 | Weinfield et al. | |

(Continued)

OTHER PUBLICATIONS

U.S. Appl. No. 60/779,824, Meylan et al., Standby Time for WLAN, Mar. 7, 2006, [0017].*

(Continued)

*Primary Examiner* — Ashley Shivers
(74) *Attorney, Agent, or Firm* — Parker Ibrahim & Berg LLC; James M Behmke; Stephen D. LeBarron

(57) ABSTRACT

A system and method allows devices to send and receive packets while using power to do so in a manner that responds to events, such as receipt or other identification of different parameters that control how packets are sent and received.

23 Claims, 4 Drawing Sheets

(56) References Cited

U.S. PATENT DOCUMENTS

| | | |
|---|---|---|
| 2003/0198196 A1 | 10/2003 | Bahl et al. |
| 2004/0151210 A1 | 8/2004 | Wilson et al. |
| 2004/0218556 A1 | 11/2004 | Son et al. |
| 2004/0228284 A1 | 11/2004 | Tuinstra |
| 2004/0246983 A1 | 12/2004 | Kaatz |
| 2004/0264396 A1 | 12/2004 | Ginzburg et al. |
| 2005/0058151 A1 | 3/2005 | Yeh |
| 2006/0187866 A1* | 8/2006 | Werb et al. ............ 370/311 |
| 2006/0240787 A1* | 10/2006 | An et al. ................ 455/118 |
| 2007/0159994 A1* | 7/2007 | Brown et al. ........... 370/324 |
| 2007/0242634 A1 | 10/2007 | Calcev et al. |
| 2007/0297438 A1* | 12/2007 | Meylan et al. .......... 370/445 |
| 2008/0188181 A1* | 8/2008 | Choi et al. .............. 455/41.2 |
| 2008/0310479 A1 | 12/2008 | Koslar et al. |
| 2009/0279465 A1 | 11/2009 | Hui et al. |

OTHER PUBLICATIONS

U.S. Appl. No. 60/760362, Brown et al., Securing Transactions Between an Electric Key and Lock within Proximity of Each Other, Jan. 6, 2006, pp. 67-68.*

Non-final Office Action mailed Nov. 9, 2011 in U.S. Appl. No. 13/220,440, 7 pages.

Notice of Allowance mailed May 16, 2012 in U.S. Appl. No. 13/220,440, 12 pages.

Written Opinion of the International Searching Authority from International Application No. PCT/US07/10005, mailed Sep. 15, 2008, 6 pages.

International Search Report from International Application No. PCT/US07/10005, mailed Sep. 15, 2008, 3 pages.

Notice of Allowance mailed Oct. 8, 2008 in U.S. Appl. No. 11/411,404, 12 pages.

Non-final Office Action mailed Jan. 21, 2011 in U.S. Appl. No. 12/380,590, 9 pages.

Notice of Allowance mailed Jul. 11, 2011 in U.S. Appl. No. 12/380,590, 23 pages.

Non-final Office Action mailed Nov. 5, 2010 in U.S. Appl. No. 12/004,125, 10 pages.

Non-final Office Action mailed Dec. 23, 2010 in U.S. Appl. No. 12/004,321, 12 pages.

Notice of Allowance mailed Jun. 8, 2011 in U.S. Appl. No. 12/004,321, 21 pages.

Non-final Office Action mailed Feb. 25, 2011 in U.S. Appl. No. 12/004,140, 9 pages.

Final Office Action mailed Aug. 18, 2011 in U.S. Appl. No. 12/004,140, 15 pages.

Non-final Office Action mailed Oct. 14, 2008 in U.S. Appl. No. 11/516,841, 18 pages.

Final Office Action mailed Mar. 31, 2009 in U.S. Appl. No. 11/516,841, 21 pages.

Non-final Office Action mailed May 14, 2013 in U.S. Appl. No. 12/004,140, 12 pages.

* cited by examiner

SYSTEM AND METHOD FOR ADJUSTING POWER USED IN RECEPTION IN A WIRELESS PACKET NETWORK

CROSS REFERENCE TO RELATED APPLICATIONS

This application is a continuation of U.S. application Ser. No. 12/004,125, filed Dec. 19, 2007, which issued as U.S. Pat. No. 8,175,073 on May 8, 2012, which is a continuation-in-part of application Ser. No. 11/411,404 entitled, "System and Method for Low Power Radio Operation in a Wireless Packet Network," filed Apr. 25, 2006, now U.S. Pat. No. 7,515,556, issued Apr. 7, 2009, and application Ser. No. 11/516,841 entitled "System and Method for Identifying Whether Remote Devices Are in Proximity," filed Sep. 6, 2006, abandoned, and is related to application Ser. No. 12/004,321 entitled "System and Method for Adjusting Power Used in Transmission in a Wireless Packet Network," filed Dec. 19, 2007, which issued as U.S. Pat. No. 7,986,652 on Jul. 26, 2011, and application Ser. No. 12/004,140 entitled "System and Method for Reducing Power Used for Radio Transmission and Reception," filed Dec. 19, 2007, all of which are hereby incorporated by reference in their entireties.

FIELD OF THE INVENTION

The present invention is related to computer software and more specifically to wireless networking computer software.

BACKGROUND OF THE INVENTION

Conventional motes are small electronic devices that sense at least an element of their surroundings and communicate information related to the element sensed. A mote may communicate just the information it has collected, or such information may be combined with that from other motes and communicated, for example, to a central device.

Conventional motes communicate wirelessly with one another and/or a central device. If the device or other mote with which the mote wishes to communicate is out of range, the mote may communicate via a multi-hop communication through other motes.

Because some or all motes may rely on a small source of stored power such as batteries, it can be desirable for a mote to conserve power. One way motes draw power is during receipt of transmissions. To keep a radio on all the time to receive any transmission can represent a substantial power drain on the mote's power supply.

One conventional way that power could be conserved is to divide the time into slots, and require the motes to leave their radios off, turning them on to listen only during some of the slots. The radios are off during other slots, conserving power. If the start of a transmission is received during one of the slots in which the mote is to be listening, the mote can keep the radio on until the entire transmission is received. A beacon is periodically transmitted to synchronize the clocks of the different motes. However, this arrangement is difficult to synchronize in a multi-hop environment.

To conserve power in a multi-hop system, some systems have one mote that wishes to communicate with another to transmit a repeating preamble signifying that a message is forthcoming. The preamble is repeatedly transmitted throughout a period in which each device turns on their radio and listens for a preamble. If the device does not detect a preamble, it turns off its radio for one preamble period, thereby conserving power. If the device detects a preamble, the device keeps its radio on until the actual communication is received. The technique thus requires the transmitter to make additional transmissions over that used by a timeslot arrangement, but reduces the power used by the receivers. Where transmissions are infrequent, the system as a whole saves power, although the power required for each transmission rises.

Recently an IEEE communication standard known as 802.15.4 has been adopted by designers of communication products, and many conventional mote manufacturers would like to use the standard for inter-mote communication. An improvement on the preamble technique that can be used with 802.15.4 communications and other types of communications is described in the related application. That application describes an arrangement in which a series of "chirp" packets is sent before one or more data packets are sent, like the preamble technique described above. However, unlike the preamble technique, each chirp packet identifies a time at which the data packet or packets will be sent. The chirp packets are sent throughout the course of a sleep period, during which other devices "sleep" in a low or no power mode, waking only for so long as it takes to hear one chirp packet during this period, and then sleeping until the data packet is received. This allows those receiving devices to conserve power during times other than when they are checking for chirp packets or receiving data packets.

Although this arrangement conserves the power of the receiving devices beyond that of the preamble technique, the sender continues to transmit a repeating chirp packet using approximately as much power as a the transmission of a repeating preamble, or even more. The sender may thus run out of power. Alternatively, the receivers may run out of power because receiving each packet may require the listening for, receipt of, a chirp packet.

What is needed is a system and method that can use the facilities of an 802.15.4-compatible device, but can allow a sender or receiver to be less likely to run out of power yet can be more efficient than an arrangement in which the receipt of a preamble causes a receiving device to keep its radio on until the actual communication is received, and does not involve a time-division multiplexing arrangement.

SUMMARY OF INVENTION

A system and method optionally uses the 802.15.4 capabilities of a receiving device to identify whether there is power being received over the frequency or frequencies monitored by the radio, and optionally performs this function periodically, according to a sleep period identified by the devices. If there is no power detected on the frequency, the system and method turns the radio off and waits until the next sleep period to start again. If power is detected on the frequency, (or, in the event that the above function is not performed) the system and method attempts to receive a packet and read a pattern in the packet header or packet payload identifying the type of packet transmitted as a chirp packet. The system and method may instead attempt to receive a packet and identify whether it is a chirp packet periodically without first identifying the energy being received on the frequency or frequencies monitored by the radio. If a chirp packet is not identified, the system and method may attempt to determine whether the packet is a data packet, accepting it if it is, in spite of the fact that no chirp packet was received.

If a chirp packet or data packet is not identified in either of the above two approaches, the system and method turns the radio off and waits until the next sleep period to start again. If the chirp packet is identified, the system and method parses the chirp packet to identify a "time to data packet", which identifies an amount of time until the sending device will provide the data packet, as measured from a point in time corresponding to the chirp packet.

The system and method then turns the receiving radio off for the amount of time corresponding to the packet, for example, the amount of time specified by the time to data packet contained in the packet, and then turns the receiving radio back on after the amount of time has elapsed. The system and method then receives the packet, if desired.

In one embodiment, other devices may, without sending another set of chirp packets, send their data packets soon after the data packet corresponding to the chirp packet has been received, and thus, even if a packet corresponding to the chirp packet is not desired by a certain device, that device might turn its radio on at the time the data packet is to be received, or at the time immediately after the data packet is to be received, in order to receive such additional piggybacked packets from other devices. The amount of time the receiving radios should remain on to receive such packets may be a fixed specified amount or it may be specified as part of the chirp packet.

The chirp packet optionally also contains an address, such as a destination address, which may be a 16 bit or 64 bit IEEE address or a broadcast address, a source address, a MAC address, any other form of an address, or no address at all, to allow the receiving devices to determine whether to receive the data packet described by the chirp packet. The chirp packet may also optionally contain information relating to any or all of the size of the corresponding data packet, the length of the transmission time of the corresponding data packet (which may be provided in seconds or other units), the number of packets to be received, whether the device transmitting the corresponding data packet will listen for data packets that are sent by other devices rapidly following the data packet or packets it sends, and other information enabling the transmitting or receiving devices to operate efficiently, for example, by leaving their radios off not only until the data packet or packets arrive, but until the data packet or packets are sent, to avoid receiving data packets not desired.

The system and method can send and receive chirp packets in a flexible way, that can respond to events. An event that can change the way chirp packets are sent may be a determination that a device is operating on battery or other portable power rather than line power, or that the device is low on battery power or otherwise may wish to conserve power. Conserving power may be desirable, for example, if the device is a solar powered device or a solar powered device with a battery backup and the time of day corresponds to the sun setting. An event that can change the way chirp packets are received or sent may include a data packet from another device such as a device that determines battery power should be conserved, or it may include a data packet from a server that had received information from other devices or can predict that some or all devices may be power-constrained.

The system and method can respond to an event by causing fewer chirp packets or more chirp packets to be sent, either by adjusting the length of time chirp packets are sent, or adjusting the frequency at which chirp packets are sent, allowing the transmitting device to turn its radio off or reduce its power when chirp packets are not being sent. Although changing the number of chirp packets can have the counterintuitive effect of increasing the overall power consumed by the system, the operation of the system can be extended by tailoring the number of chirp packets to accommodate the type of device that may run out of power first. Thus, a device that is power constrained may use the counter-intuitive approach of identifying parameters that use more power than they otherwise could, but will conserve the power of an even more power constrained device.

The system and method can, before it sends chirp packets, wait until one of one or more measurable quantities meet a threshold, before initiating the sending of the series of chirp packets after some or all of the first packet is received for transmission. During the interim, some or all of other packets may be received for transmission, allowing all such packets to be stored and then sent as a batch, in order to save power of the sender, receiver, or both. The measurable quantities may include one or more of an amount of time since the initial packet or portion was received, a number of data elements received for transmission, or an amount of data received for transmission. The threshold or the quantities may be changed as a function of the need by the sending or receiving device to conserve power. The thresholds may be increased not only for devices for which it is desirable to conserve power, but also for devices that send transmissions to such devices, providing the counterintuitive option of causing devices that have plenty of power to hold data longer before sending it, to allow other devices to conserve power.

DETAILED DESCRIPTION OF A PREFERRED EMBODIMENT

Figure 1:
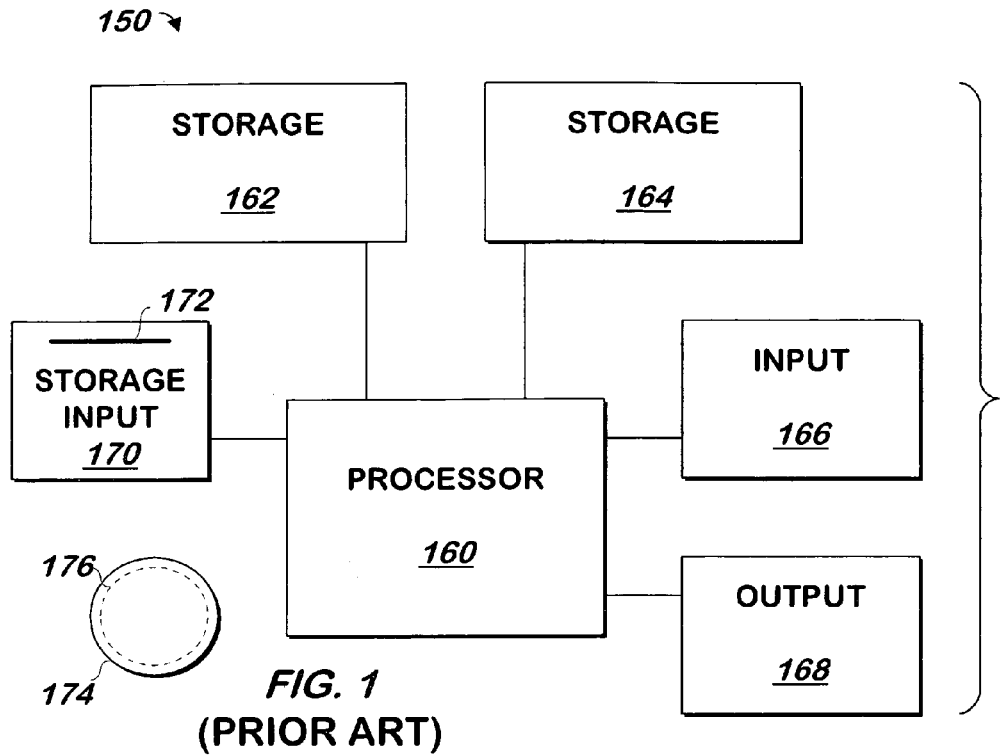
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard, buttons or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the Linux operating system commercially available from the Web site of Linux.org, the BSD operating system available from the Web site of freebsd.org, or the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE, INC. COMPUTER of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used. In one embodiment, systems may be based on the conventional MSP430 commercially available from Texas Instruments, Inc., of Dallas, Tex., or the atmega128 commercially available from Atmel Corporation, of San Jose, Calif., or the PXA xscale commercially available from Intel Corporation of Santa Clara, Calif. Such systems may run the conventional TinyOS, commercially available from the web site of SourceForge.net or another operating system, such as a real time operating system.

Figure 2C:
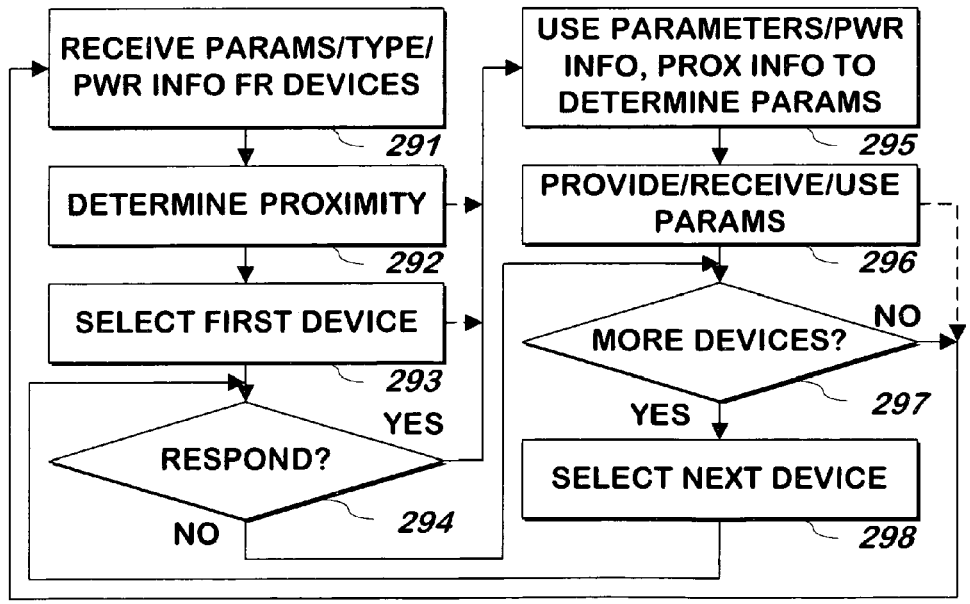
FIG. 2C is a flowchart illustrating a method of identifying one or more parameters according to one embodiment of the present invention.
Figure 2A:
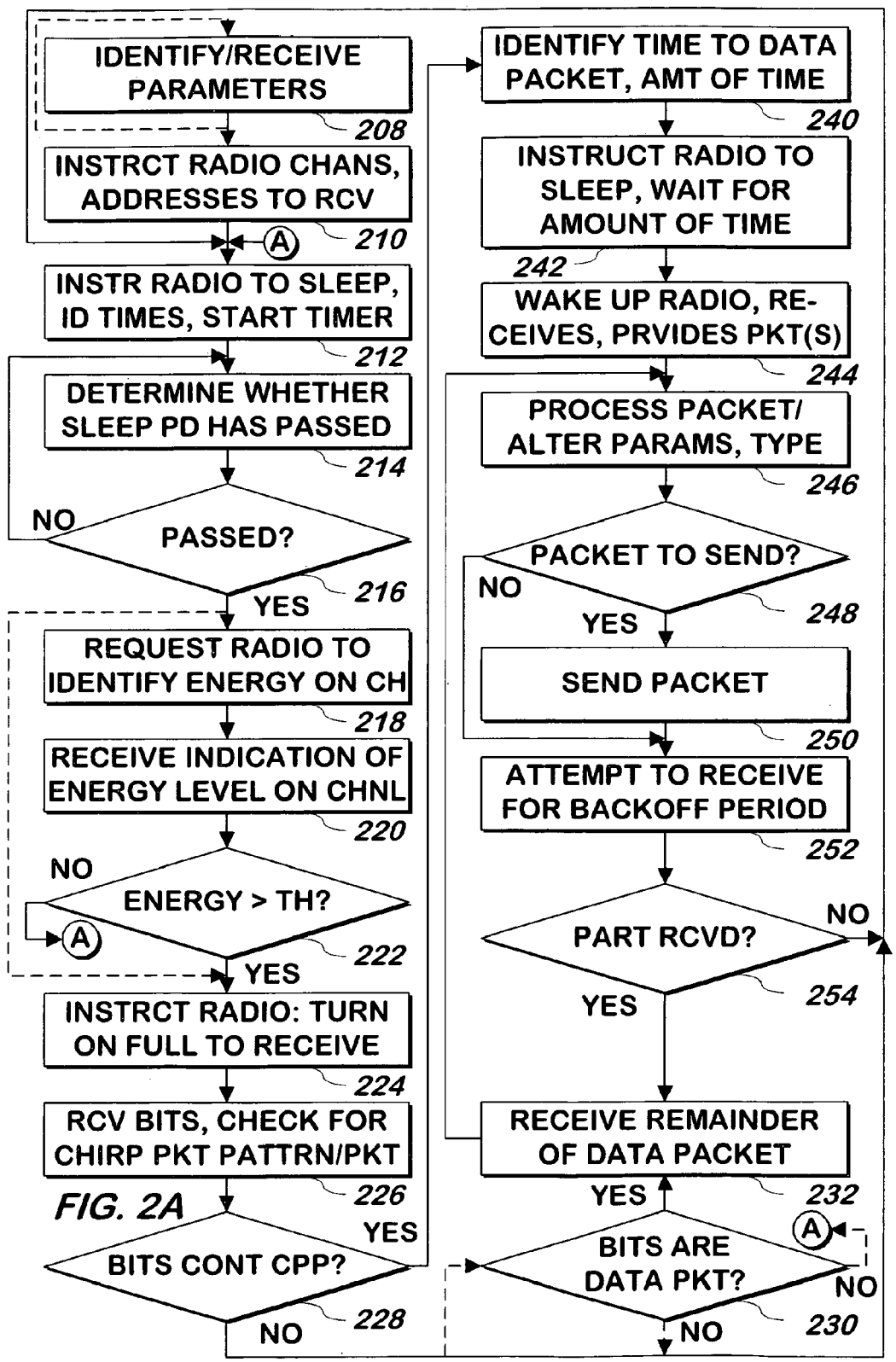
FIG. 2A is a flowchart illustrating a method of receiving packets in a manner that conserves power according to one embodiment of the present invention.

FIG. 2A is a flowchart illustrating a method of receiving and sending packets in a manner that conserves power according to one embodiment of the present invention. The method may be implemented in an 802.15.4-compatible device or any other device.

Identify Parameters

Referring now to FIG. 2A, certain parameters may be identified 208. In one embodiment, any or all of parameters affecting or including a sleep period, a chirp period, a chirp interval, a listening window, and one or more thresholds, may be identified. These parameters are described in more detail below, and correspond to transmission and/or reception of communications between devices.

The parameters may be identified by receiving them. For example, an administrator may enter the parameters manually, or they may be received from a device such as a ROM, or they may be received via the radio or a serial port, for example, as part of a command to change any or all of the parameters or in any other conventional manner as described in more detail below. Such receipt may be from a gateway or server or other device with which the device receiving the parameters will communicate.

The parameters may be identified by deriving them using other information, such as by using type information, detected, or, received in any of the manners described herein for receiving the parameters themselves. For example, a type of "battery power", or "line power" may be received or detected, indicating the type of power currently being used by the device receiving the parameters, or the type of power that should be used by that device. The parameters may be identified by deriving them using other information in addition to, or instead of, a type. Such other information may include a voltage, a current, other information related to power or the nature of a supply of power, or a time of day. For example, a type of "solar-recharged battery power" and a time of day of after 5 pm and before 7 am may cause the device receiving such information to identify a set parameters that may differ from the parameters that would be identified with a type of "line power", or a type of "solar-recharged battery power" and a time of day of after 7 am but before 5 pm. The parameters may be derived using a table lookup that uses the type or other information from a table.

Sleep Period and Chirp Period.

One set of parameters that may be received is the sleep period, and the chirp period. Sets of parameters need not be received at the same time, but are discussed together for ease of understanding.

The sleep period is a length of time, having the same value among devices, during the span of which each device is to awaken at least once, to either gauge the energy on the channel, listen for a chirp packet, or both as described in more detail below.

The chirp period is the amount of time that a device that intends to send data, should send chirp packets in advance of that data, as described in more detail below.

As noted herein, different devices may employ different chirp periods but use the same channel to transmit them, and the sleep period of a receiving device would ordinarily be set not greater than (and may be set a little less than) the minimum chirp period among those devices from which the device may receive chirp packets and data packets on the same channel, as described in more detail herein. In another embodiment, the chirp periods are the same for all devices, though the number of chirps per period may be different as described in more detail below, in which case all devices have a sleep period equal to, or a little less than, the chirp period of all of the devices. Other embodiments use sleep periods equal to, or a little less than, chirp periods, with devices having different chirp periods using different channels. To maximize the sleep period, yet potentially receive every communication, the sleep period may be set to allow, under the worst case scenario, the receiving device that sleeps at the start of the broadcast of the sending device's first chirp packet, to be able to receive at least the last chirp packet in the same series of chirp packets for the device having the smallest chirp period from which communications may be received from that device. If the device will first listen for energy on the channel, if the chirp packet being broadcast at the time would not be able to be received, the sleep period would be set to allow at least a part of a second to the last chirp to be detected as energy on the channel before receiving the last chirp packet under such worst case scenario.

Listening Window and Chirp Interval

The chirp period and sleep periods are one way of trading off the power used by the sending and receiving devices, however, other parameters may be used to reduce or increase the power used by the sender or receiver of data packets. In one embodiment, a listening window and chirp interval may be used. The chirp interval is a total amount of time that is used to send one chirp packet, including any downtime between chirp packets. This allows the sender to operate in a reduced power mode in between chirp packets (for example, by turning its radio off between chirp packets), while requiring potential receivers to remain on for a longer period of time to detect the chirp packet, referred to as a "listening window". The listening window is a window of time for which a radio of a receiving device should remain on, at least some of the time, to ensure that one chirp packet will be received, if sent. A device that may receive chirp packets from devices having different chirp intervals on the same channel would ordinarily set its listening window to the longest of the chirp intervals used on that channel, or the longest possible chirp interval and optionally, a little more time.

For example, if chirp packets are broadcast one after the other, with no down time between them, the listening window could be the amount of time it takes to broadcast two chirp packets plus a start frame delimiter described below, or the listening window could be slightly less than this time, or the listening window could be the amount of time it takes to broadcast one chirp packet, or it could be the amount of time it takes to broadcast slightly more than one chirp packet. If devices can broadcast chirp packets less frequently, the listening window can be increased beyond the amounts specified above by the maximum possible amount of time between chirp packets. In circumstances in which the data rate may change, the listening window may be determined based on a minimum data rate or an average data rate, or a best case data rate.

In any event, the less power-constrained (or those predicted to be less power-constrained) devices may attempt to transmit using the parameters that cause transmissions to use the most power (thus allowing the receivers to use less), while the most power-constrained devices (or those predicted to be) may attempt to transmit using parameters that use the least amount of power (and thereby requiring the receivers to use more).

The receivers can adapt or can be caused to adapt to any changes in the transmitters parameters. In one embodiment, the receivers parameters are identified in a manner that will ensure that they do not miss any transmissions. However, other embodiments may allow missed transmissions. Such embodiments may be used where there are many potential receivers, where the transmissions are not urgent or where they can occasionally be missed without problems. Thus, a temperature sensor transmission that is used for informational purposes may be arranged to be received on average every other time if battery power in the receivers falls below a threshold.

Channel Information

In one embodiment, the parameters include channel information, though other parameters, described below, may also be received, derived or otherwise identified. The channel information may include the one or more frequencies and/or logical channels over which the device communicates with other devices and may optionally indicate a multicast or other address corresponding to communications that should be received. Such other address may be a short address, a MAC address or any other form of address. More than one address or more than one type of address may be received. It is not necessary that the channel information include an address at all, as communications containing all addresses or no addresses may be received. Channel information may include a number of frequencies, which may be scanned.

In one embodiment, the parameters and channels are interrelated. For example, each channel may correspond to a specific set of transmission parameters. A device that identifies transmission parameters as described above may then use a channel corresponding to those parameters. Alternatively, a channel may be identified using any of the methods for identifying parameters described herein, and then the parameters corresponding to the identified channel may be used.

Determination of Parameters.

The parameters are identified as part of step 208 in response to one or more events. The events include receipt of the parameters, receipt of one or more other devices' parameters or a determination that the device or a different device is exhibiting a characteristic, such as a low battery, or the potential to have a low battery. The parameters may be received by being hard coded into a computer program, stored in a ROM or otherwise, in which case the parameters may be fixed by the device that will send or receive information wirelessly as described herein. For example, if some devices that transmit information are battery operated, and all devices that receive such transmissions are line powered, the battery powered transmitters may have a chirp period or chirp interval set to allow lower power operation, and in one embodiment all such transmitters or the battery-powered transmitters would use this lower power operation. Lower power transmission would employ a longer chirp interval or a shorter chirp period, or both. In another embodiment, the line powered transmitters would identify parameters that would use more power, such as a shorter chirp interval or a longer chirp period, or both. The parameters (listening window, sleep period or both) of the receivers are set to accommodate either type of transmission (i.e. a listening window equal to the longest chirp interval or a sleep period equal to the shortest of the chirp periods) or, in the embodiment in which all transmitters use the lower power-using transmission, the receivers of such transmissions would identify parameters that would allow reliable receipt in a manner consistent with the lower power-using transmission.

In this manner, some, most, or all of the devices that are most power constrained are operated in using parameters that conserve the use of power during any function (e.g. sending or receiving) performed by such devices, and the other devices with which they communicate identify parameters consistent with those of the other devices. Devices with which those devices are communicating use more power than they otherwise could when those devices use less, and vice versa. Because the line powered devices or devices that are not otherwise power constrained or predicted to be power constrained are not in need of conserving power, the change of parameters that causes them to use more power will allow the more power constrained devices to use less power, but continue to communicate with them. Similarly, when the power constrained devices identify parameters that allow them to conserve power, the non-power-constrained devices will communicate using more power.

It isn't necessary to trade off between sending and receiving by the same device. A power constrained device that only communicates with a non-power constrained device could identify parameters that allow it to both transmit and receive using the least amount of power. A device that never transmits, but only receives, could identify parameters that minimizes power used to receive. However, it is noted that, because that device may transmit to multiple devices that are also power constrained, it may be more power efficient to the system as a whole for that one device to identify parameters that use the maximum transmission power for communications it sends, in order to conserve the power used by multiple devices to receive such communications, particularly when transmitted communications are infrequent relative to the number of times the receiving devices listen for such communications. Thus, parameters may be identified herein in a counter-intuitive fashion to conserve power among those devices that may be, or may be predicted to be, power constrained.

To allow devices to properly identify their own parameters without a server or gateway overseeing such identification, priority may be assigned to devices based on the number of messages they are expected to transmit or receive or different priorities may be assigned to each of these, each device may transmit its priority and devices in contact with one or a threshold number of higher priority devices might not adjust their parameters based on the priority of other devices with which they are in communication, even if the lower priority device is power constrained. Devices may transmit to one another the degree to which they may be power constrained as well as their priority, with the various devices identifying parameters that balance the degree of power constraint with the priority, both of the device and the power constrained devices with which they are communicating.

As noted, the identification of the parameters may be made by receiving them from a gateway, server, or other device, and the gateway, server or other device may determine the parameters in a manner that minimizes overall power consumption or maximizes total system operation time, for example by balancing the power needs of various power-constrained devices or devices predicted to be power constrained, using reports maintained via received communications of their power availability and recording and identifying the number of messages sent and received by the various devices to predict how active they will be.

In one embodiment, either the different chirp periods used by different devices or the numbers of chirps per period used by different devices in communication with one another vary by a multiple (which may be a power of two) of one another for all devices whose transmissions may be received by a single device. For example, the chirp period or number of chirps per period of one device will be either two times or four times that of another device. This would allow different devices to operate at different multiples of one parameter, for example, a chirp period, while allowing other devices to communicate with any of the devices using different multiples of the corresponding parameter. For example, two transmitting devices, with one using a chirp period that is twice as long as the other could be reliably received by devices employing a sleep period that is, or is slightly less than, the shorter of the two chirp periods.

As noted, rather than receiving one or more parameters explicitly, some or all of the parameters may be determined based on one or more types. The type may be received in any of the manners described above for receiving parameters, or the type may be detected by periodically checking or receiving an event. For example, the type "battery power" may be detected when line power is unplugged, or a type "low battery" may be detected when a voltage drops below a threshold. The event or events used to determine the type may be directly related to the type, or the type may be derived, for example, by induction. For example, for devices that are solar powered with a small battery backup, a clock or clock and calendar (or the voltage supplied to the batteries by the solar cells) may be used to determine when the sun is about to set and therefore power should be conserved. Thus, while a device is operating in a circumstance in which conserving power is more important, for example, when the device switches from line power to battery power, or when a solar powered device with a battery store determines or predicts that its supply of solar power is being or will be reduced or eliminated, the device will identify parameters that use less power, on average, for each transmission, and otherwise, it will identify parameters that use more power, on average, for each transmission, thereby allowing the devices with which it communicates to use less power. Other circumstances that could cause a change in parameters being identified may include determining that a distance from a recharge station is exceeding a threshold, or a determination that an end of a period in which a battery is needed is approaching with more power in a battery or other store than is estimated to be needed or that a battery has less charge at a given time than is estimated to be used before the battery is scheduled to be recharged.

If devices that primarily send or primarily receive are all line powered, such devices can identify parameters to operate in the highest-power consuming mode, for example, using a smallest sleep period or longest listening window that would correspond to the periods used by the transmitting devices.

In one embodiment, devices that primarily perform one function or another can periodically inform any receiving device in the vicinity what its parameters are or what the receiving device's parameters should be (or the receiving devices can inform the sending devices) and the receiving devices (or sending devices) can adjust their parameters according to the most strict of the parameters with which such receiving device (or sending device) will receive (or send) transmissions. For example, a receiving device will receive chirp periods or sleep periods and will set its sleep period to the smallest sleep period or consistent with the smallest chirp period it receives. Thus, a device can receive an indication to respond in that manner and will do so. Priority may be assigned to devices, which broadcast their priority, the type of action they perform more often (send or receive) and the corresponding parameters, and devices with lower priority will respond to devices with higher priority in the manner described above.

As noted, in one embodiment, the gateway or another device may specify the parameters, causing the device to identify as parameters those received from the gateway. The gateway may receive the parameters under which some or all of the devices are operating (or may receive types and convert the types to parameters), identify the devices with which each such device is, or could be, in communication, receive or otherwise identify the type of the device, and then instruct each such device to operate in a manner consistent with the devices with which that device is in communication. For example, the gateway may receive location information and a device identifier from each device, look up the type of the device based at least in part on the device identifier and a table of devices and their types it maintains, determine what the parameters of the primarily transmitting devices is, determine which devices are, or may be in communication with such devices, for example, using locations of the devices, and the instruct devices that may receive communications from one or more such devices to operate according to the strictest parameter of those one or more devices. For example, if a device may receive communications from several devices, of which one is operating using a smaller chirp period than the others, the gateway may instruct that receiving device to operate according to a sleep period equal to or somewhat less than that smallest chirp period. Alternatively, the gateway may set the parameters for devices with the smallest chirp periods to increase their chirp periods. The gateway chooses which of these actions to take. The gateway can set the parameters of the other devices as well. Any such device can provide to the gateway an identifier and a report of its power status (e.g. line power and low, not line powered but not low, or line power) and the gateway can set the parameters of all such devices based on the needs of the devices in order to maximize an operational capability of the system of devices, such as to maximize the expected operational time of all devices. The devices can report whether they send more than receive, or the gateway may look up such statistics based on received communications associated with the identifier of the device, or may perform a table lookup of whether and how frequently such device sends or receives, such table having been previously populated by a system administrator based on estimations.

Proximity among devices may be determined by each of the devices reporting their location and then the gateway or other devices determining whether they are in theoretical proximity to that device, or may be determined as described in the related application, and such proximity may be reported by a device to a gateway or other devices.

In other embodiments, instead of receiving parameters from some or all of the devices (e.g. all of the transmitting devices or all of the receiving devices) and then directing the remaining devices to set their parameters in accordance with those received parameters and an indication of proximity, the gateway may direct all of the devices to set their parameters, for example by selecting one group of devices (e.g. those that primarily or entirely transmit or those that primarily or entirely receive), directing those devices in one such group to set their parameters appropriate to characteristics such as source of power or expected source of power for that group, and then directing other devices to set their parameters consistently with the devices with which they are in communication, when the parameters of the other devices are received, either from the gateway, or the other devices, as described above.

Step 208 may be performed as part of an independently running process as shown by the dashed line in the Figure. Thus, for example, as one or more characteristics change, for example, the amount of power available or believed to be available is reduced, such characteristics are detected and used to determine whether new values of the parameters should be identified. The event causing the identification of the new parameter values would be the detection of the changed characteristics, in that example. Detection of characteristics unchanged or unchanged sufficiently to cause a change of one or more parameter values as compared with a previous detection of such one or more characteristics would not cause such parameter values to change.

Instruct Radio which Channels to Monitor and which Addresses to Receive

The radio of a device implementing the method is instructed 210 which frequencies to monitor and which addresses to receive communications using the information received in step 208. In one embodiment, the radio may be instructed to receive communications for one or more addresses specific to itself, and/or for one or more multicast addresses, or, as noted above, no addresses may be specified and the radio will receive communications addressed to any address or no address. In one embodiment, the radio is a conventional IEEE 802.15.x-compatible radio that provides some or all of the capabilities described by one or more 802.15.x specifications. The radio transmits and receives data over a wireless network, though wired networks may also be used. Other radios and/or protocols may be used, such as the conventional 802.11 a/b/g/h or other similar protocols.

Instruct Radio to Sleep and Start Timer

At step 212, the radio, and optionally other devices, are instructed to enter sleep mode, a timer is started or an interrupt is set to allow the detection of the end of the sleep period received at step 208, and the method continues at step 214. When such instruction is received, the radio and/or other devices enter sleep mode. To enter into sleep mode, the radio may be directed to decrease power or stop performing one or more operations or to power down completely or nearly completely. As a result, energy provided to, and used by, the radio is decreased as compared with the energy used when the radio is capable of receiving packets or other communications as described herein. Additionally, in one embodiment, a processor and/or other circuitry may also power down during the sleep period.

Determine Whether Sleep Period has Passed

A determination is made whether the sleep period received at step 208 has passed 214. To determine whether the sleep period has passed, the status of the timer may be checked. In one embodiment, if the timer has reached zero, it is determined that a sleep period has passed; otherwise, if the timer has not reached zero, it is determined that the sleep period has not yet passed. Alternatively, the timer may count forward, instead of backwards, until the sleep period has passed. In another embodiment, the determination of the sleep period passing may be made when a timer interrupt is generated by an operating system, such timer interrupt being set as a part of step 212.

If it is determined that the sleep period has not yet passed 216, then the method may continue to check the status of the timer at step 214, in order to determine when the sleep period has ended, or step 214 waits until the timer interrupt is received by the operating system.

Request Radio to Identify Energy on the Frequency Corresponding to the Channel

When the sleep period has passed 216, the radio is optionally requested to identify energy on the frequency or frequencies, 218, and in another embodiment, indicated by the dashed line in the Figure, step 224 follows the "yes" branch of step 216, and steps 218-222 are not performed. In one embodiment, the radio used to wirelessly communicate packets or other information as described herein has two or more power levels that can be selected. At a lowest power level, referred to as full sleep mode, the power consumed by the radio is less than the power required to monitor energy on the frequency or frequencies, and lower than the amount of power to receive bits over that frequency or those frequencies. At the highest power level, the radio can receive bits over the frequency. The activity of identifying energy on the frequency may be performed at either of those power levels or at a third power level between them. In the case of the third power level, it is higher than full sleep mode but lower than the energy required to receive bits. In another embodiment, the radio only has two power levels, such as "on" and "sleep".

To request the radio to identify energy on the frequency, the radio is provided with sufficient power to emerge from full sleep mode and identify the energy on the frequency.

In one embodiment, the radio is instructed to turn on, or turn up to the third power level, for an amount of time equal to the listening window, received in step 208 as described above, or the determination of energy on the channel may be performed using a shorter amount of time.

In one embodiment, the radio is turned on and off during the listening window as part of step 218. The radio is turned on long enough to determine that there is no energy on the channel, and if none is detected, the radio may be turned off for slightly less than the amount of time it takes to receive a chirp packet, at which time the radio is turned back on again, and such process repeats during the listening window.

Receive Indication of Energy Level on Channel

An indication of the energy level on the frequency or frequencies may be received 220. In one embodiment, to receive an indication of the energy level on the frequency or frequencies, the radio is requested to provide a numerical energy level indicator.

If the energy level does not exceed a threshold 222, the method continues at step 212. The threshold may be a preprogrammed number or it may be received as part of step 208. The threshold may be changed or adapted according to the specific environment or sensitivity setting of the radio. For example, if energy is detected on the frequency or frequencies far more often than chirp packets are detected and received as described below, the threshold may be raised, and if chirp packets are almost always detected and received as described below after energy on the frequency or frequencies is detected, the threshold may be lowered to keep the relative number of times that chirp packets are detected to the times that energy is detected within an acceptable range.

Data to Receive:

Instruct Radio to Turn on Full

Either if the energy level on one or more frequencies exceeds the threshold 222, or, in the embodiment in which step 224 follows the "yes" branch of step 216, the radio is instructed to turn on fully to attempt to receive bits 224. In one embodiment, the radio may be turned on until a sufficient number of bits of a data packet are received, or until a maximum length of time has elapsed, which may be equal to the length of the listening window. As will be described in more detail below, the radio may be turned off again to conserve power once a sufficient number of bits have been received.

Receive Packet and Check for Chirp Packet Pattern

If bits are received, the bits are scanned as they are received to attempt to identify a start frame delimiter, a chirp packet pattern, or both, that can be used to identify a chirp packet 226. A start frame delimiter is a recognizable pattern of bits that is provided before any packet or set of packets, and may be referred to as a frame start delimiter or FSD. A chirp packet pattern may be a series of bits in the header portion of a packet that also form a recognizable pattern that indicate the packet is a chirp packet (as opposed to, for example, a data packet), and may be different or the same as the start frame delimiter. In one embodiment, each chirp packet pattern will be the same for every chirp packet sent. Other bits in the chirp packet include a "time to data packet", described in more detail below, as well as other optional information described herein.

If no chirp packet pattern is identified 228, the method continues at step 212. In another embodiment, as the bits are scanned in step 226, a determination is made as to whether the bits correspond to a data packet or part of a data packet. In one embodiment, a data packet is a packet other than a chirp packet. If the chirp packet pattern is not identified in the received bits 228, as indicated by the dashed line in the Figure, if the bits correspond to a data packet or the start of a data packet 230, any remainder of the packet is received from the radio 232 and the method continues at step 246. A data packet may be identified if a start frame delimiter is detected, but a chirp packet pattern is not detected in the position in which it would appear in a chirp packet, for example, relative to the start frame delimiter. In one embodiment, a start frame delimiter is a recognizable pattern that is provided before any packet: data packet or chirp packet. If the bits correspond to neither a chirp packet or a data packet 230, e.g. because no start frame delimiter is detected, the method continues at step 212.

Identify Time to Data Packet

If the chirp packet pattern is identified 228 in the stream of bits, the "time to data packet" is identified 240 in the chirp packet and a length of time corresponding to this time is identified. To identify the "time to data packet", the chirp packet is processed or parsed. The bits received may include parts of two data packets, provided by the sender of the data packets in the same manner as described below with respect to FIG. 2B. In one embodiment, the time to data packet may be taken from either such part of a packet, or if the time to data was itself split into to two portions in each data packet, it may be inferred from both portions. If necessary, the length of time may be identified by adjusting the time to data packet to accommodate the delay required to receive and process the chirp packet, and the adjustment may factor the portion of the chirp packet or packets containing the time to data packet received to factor in the amount of time since the packet or the start frame delimiter for that packet was received.

In one embodiment, the "time to data packet" in any chirp packet is the amount of time, from the start of the packet, start of the start frame delimiter, or the end of the chirp packet, that should be allowed to pass (with the receiving radio set to sleep, turned off, or running on reduced power, if power conservation is desired), at least for use by the same frequency as was used to receive the chirp packet, before the broadcast of the actual data packet. The time to data packet may be measured in conventional time units or it may also be measured in chirp intervals, which is the length of time it takes to broadcast one chirp packet, including the start frame delimiter. It is noted that the radio may be turned on for other purposes, while waiting for the time to data packet to elapse.

In one embodiment, the chirp packet may also specify a length of the expected transmission time of the data packet or packets, or the size of the data packet or total size of all data packets to be received. In one embodiment, the chirp packet may include the number of data packets to be provided following the chirp packets. Any or all such information is identified as part of step 240 from the chirp packet or packets received. This information allows a receiving device that does not wish to receive the data packets sent by the device that sent the chirp packet to keep its radio off, at least for the purpose of receiving packets on the same channel, not only for the amount of time corresponding to the time to data packet, but also to keep its radio off during the transmission of the data packet or packets from the device that sent the chirp packet. Such information can reduce collisions from communications sent by other devices with subsequent packets the device that sent the chirp packet intends to send following the data packet that will be sent at or around the time to data packet.

In one embodiment, the amount of time the radio will sleep, identified in step 242, not only is determined by the time to data packet contained in the chirp packet received, but also by whether the data packet or packets are to be received, with the amount of time corresponding to the data packets, or a time corresponding to this time, being added to the amount of time if data packet or packets sent by the sender of the chirp packet are not to be received. If packets from the sender are not to be received, the recipient of the chirp packet may sleep long enough to avoid listening for the data packet, but then wake to receive piggybacked packets.

Instruct Radio to Sleep Until Time to Data Packet

The radio is caused to enter energy-conserving sleep mode or is powered off until the amount of time identified as described herein is reached 242. For example, the radio may be caused to enter a low- or no-power mode for an amount of time just under the amount of time corresponding to the time-to-data-packet in the chirp packet just received. Or the radio may be caused to enter a low- or no-power mode for an amount of time just under the amount of time identified as described above, plus the amount of time estimated to be used to transmit the data corresponding to the chirp packet.

This may be done by setting a timer interrupt for the amount of time described above, when such amount of time has been identified. When the interrupt is received, the radio is instructed to awaken. In another embodiment, a timer may be used and manually monitored in place of the interrupt. In another embodiment, the radio itself contains a timer and the command provided to the radio to instruct the radio to enter sleep mode contains the amount of time (optionally less a small amount of time), to allow the radio to wake itself at that time. Other components may be caused to operate in a reduced-power mode or no-power mode when the radio is so instructed.

Radio Wakes Up and Receives and/or Broadcasts Packet(s)

The radio (and any other components that were caused to operate in a low- or no-power mode as described above) is fully awakened after the amount of time has passed, and one or more data packets are received and/or provided 244. To fully awaken the radio and receive one or more data packets, in one embodiment, the radio is signaled to apply full power to receive a data packet or packets being broadcast by devices operating on the channel or channels specified as described above.

Process Packet—Including Updating Parameters

The one or more data packets received in step 244 are processed 246. To process a received data packet, the header portion and/or payload portion of the one or more packets are parsed and processed in any conventional manner. In one embodiment, processing a packet involves providing the payload of the packet to a storage device or a different process that interprets the information contained therein or forwards it to another device.

In one embodiment, the data packet(s) received may comprise a command to change one or more parameters. For example, a data packet may include a command to change the sleep period to a specified period, to change the chirp period, and/or chirp interval used to broadcast chirp packets as described in more detail herein and below, and/or to change the sleep period and/or listening window that the radio uses to detect energy and listen for packets as described herein and above. Instead of specifying one or more parameters to use, data packet may indicate one or more parameters used by another device, to allow the receiving device to determine its own parameters as described above. Such parameters of the other device may be explicitly stated in the data packet, or they may be inferred from the data packet. For example, a data packet may include information stating that device 17, which may be the initiator of the data packet, or it may be initiated by another device or by a gateway) is low on battery power. The receiving devices can then use a table lookup to determine that the device will be using a certain chirp period or chirp interval, and may set their parameters in accordance with those parameters, if they wish to receive communications from that device.

Additionally or alternatively, in one embodiment, the data packet(s) may include a type determination that informs the device receiving the type determination of a type that is to be associated with the receiving device. In one embodiment, different types may correspond to different predefined sleep periods, chirp periods, listening windows, and/or chirp intervals, and processing a type notification may also cause the sleep period, listening window, and/or chirp interval to change. A table of such type information may be received in step 208 and the parameters may be set for the receiving device based on the type received, for example, via a table lookup.

For example, as noted above, a device may receive a data packet that directs it to conserve power. Such a device may thus use a shorter chirp period or chirp interval. Another communication may indicate that the device should no longer conserve power, and the device would identify a longer chirp period or chirp interval in response.

In another example, a device may receive data packets indicating that the devices from which it may receive communications is operating using a certain chirp interval, and such data packets may be received from several such devices. Devices that are to receive chirp packets and process data from devices using two different chirp intervals or only from devices using the shorter chirp interval would use a shorter sleep period than one that only receives chirp packets and processes data from a device that employs the longer chirp interval. The device may determine other parameters in a similar manner based on the parameters of one or more devices with which that device may communicate in either direction.

It is noted that data packets are not the only type of packets that may contain parameter information. In one embodiment, each chirp packet may indicate that the sending device will use a different parameter to send or receive subsequent packets and the receiving device will determine whether to change its parameters, and change them if required, in response to such information as described above.

In one embodiment, in addition to receiving such type determinations, as part of step 246 and/or as part of another step such as step 208, the device may make an internal determination as to its type, priority or the parameters it should use as part of step 208 and, may set the sleep period, listening window, chirp interval based on the type, for example using a table lookup. The device may periodically check its status to determine if any changes have occurred, and if so, may adjust the sleep period, listening window, chirp interval according to its new type.

No Packet to Send: Wait for Piggybacked Packets and then Enter Sleep Mode

In one embodiment, a data packet may be broadcast, as described below, shortly or immediately after the time a data packet is received to take advantage of fully awakened and receptive radios monitoring the channel. As described in more detail below, other devices monitoring the channel may attempt to provide one or more data packets following the receipt of the data packet described by in the chirp packet, without providing a separate chirp packet or waiting for a sleep period. Such a packet or packets may be provided by the device that sent the chirp packet or by any other device. If more than one device attempts such a broadcast at the same time, conventional network collision detection and back-off techniques may be used. In one embodiment, receiving devices will keep their radios on for slightly longer than the maximum back off period following the receipt of the packet described in the chirp packet or any other data packet received in an attempt to receive such piggybacked data packets from other devices or the same device. Other embodiments may use other periods shorter or longer than the maximum back off period, which may be received as part of step 208. In other embodiments, the chirp packet includes the period and such period is used. In such embodiment, step 240 includes identifying the period within the chirp packet and storing the period for use as described herein.

If the receiving device does not have a packet to send in this piggybacked fashion 248, the method continues at step 252.

Send Packet

If the receiving device has a packet to be sent 248 over the same channel, that packet is sent 250, and the method continues at step 252. In one embodiment, the packet is sent while the radios communicating on the same channel(s) as the newly received data packet are fully powered and prepared to receive one or more packets. As noted, conventional collision detection and back off techniques may be used to broadcast packets as part of step 250.

At step 252, an attempt is made to receive at least a part of a piggybacked packet before the maximum back off period has elapsed since the last data packet was received. If a data packet is received 254, any remainder of the packet is received 232 and the method continues at step 246. Thus, once a time to data packet has elapsed and the data packet corresponding to the chirp packet has been provided, data packets may be received from the same device as the device that sent the chirp packet or any other device, and any such sending device may send any number of packets.

Data to Send:

Set Offset=0

In one embodiment, any device may initiate the sending of one or more data packets by preceding them with a series of chirp packets as described above. In one embodiment, such data packets may be received for transmission from another process that generates them. Any such packets are provided as will now be described if there is no activity on the frequency or no data packet is received or both, as described above.

Figure 2B:
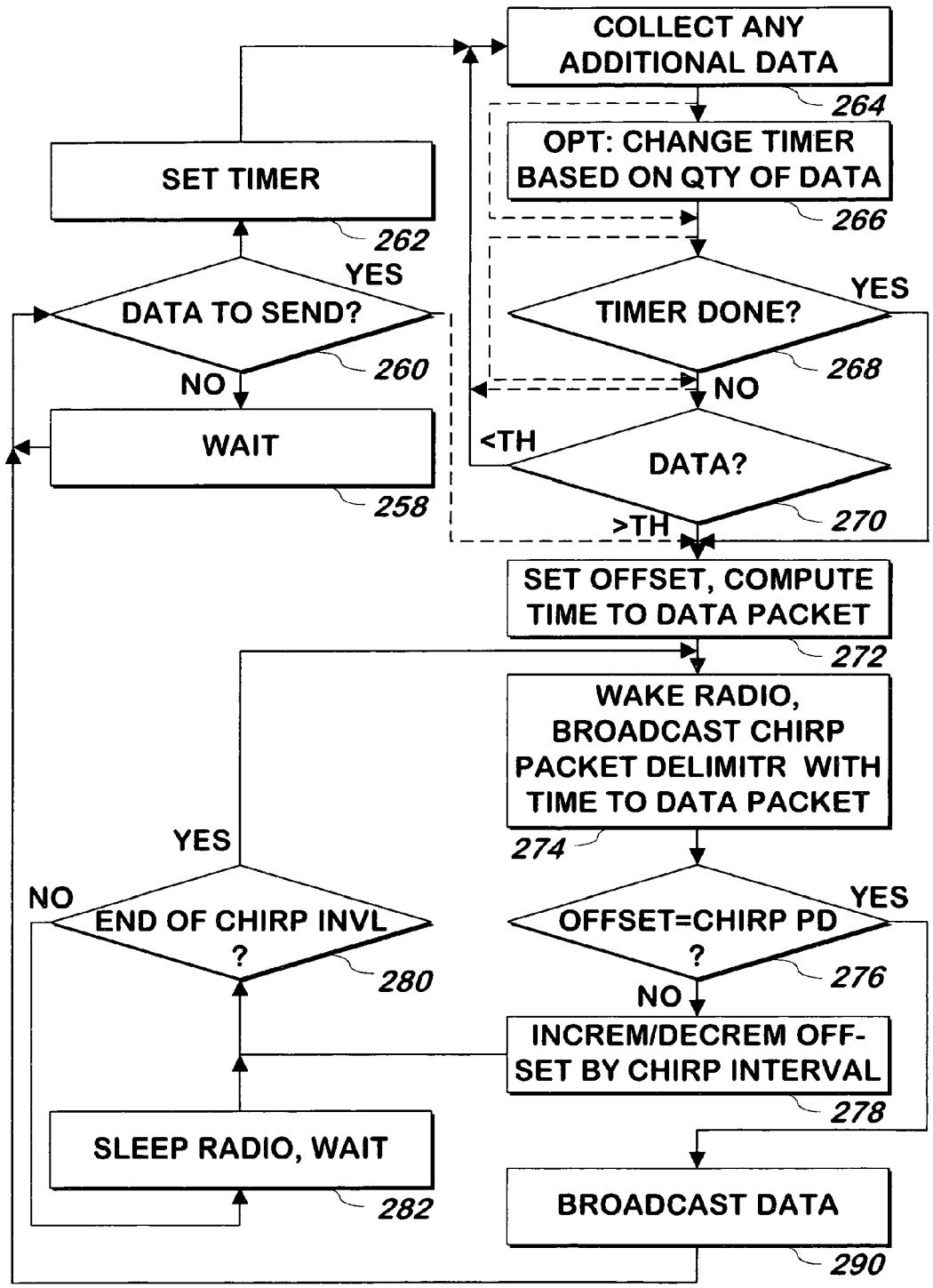
FIG. 2B is a flowchart illustrating a method of sending packets in a manner that conserves power according to one embodiment of the present invention.

FIG. 2B is a flowchart illustrating a method of receiving packets in a manner that conserves power according to one embodiment of the present invention. The method may be implemented in an 802.15.4-compatible device or any other device. The steps of FIG. 2B may be performed in conjunction with the steps of FIG. 2A, typically as part of the same device and generally simultaneously. Thus, steps of FIG. 2A in which the radio is instructed to operate in a low power or no power mode can be overridden by steps of FIG. 2B and vice versa. When the radio is instructed to change modes to a higher-power mode, the prior power mode is retained and stored, and the prior lower power mode is restored when the higher power mode is no longer needed. Where higher power periods overlap, the radio will only actually be placed in the lower power mode when the last of the overlapping higher power periods is complete.

At step 260, a determination is made whether a data packet is to be sent. In one embodiment, the steps for checking for data packets to broadcast may happen concurrently with and independently of the steps for checking for data packets to receive, or the steps may be performed in a sequence, as in this example. If no data packet is to be sent 260, then the method waits for a brief period of time 258 and continues at step 260.

In one embodiment, if a data packet is to be sent 260, the method continues at step 272, described below, to allow the process of sending the data packet to be started immediately after or very soon after the determination is made that a data packet is to be sent. In one embodiment, this determination is made when data is received for transmission from another process. Thus, as packets are received, they are immediately chirped and sent.

Queuing of Packets to be Sent

In another embodiment, even when data is received for transmission as described herein, the system and method may not immediately transmit it, to allow additional data to be received for transmission, so that subsequent data which may be received while waiting and sending chirp packets can be transmitted along with the initially received data. During the time data is not sent, other data may be received and so the determination of whether the data packet is to be sent is repeated at each iteration of step 260 until a determination is made that data is to be sent. Thus, the determination of whether data is to be sent in step 260 is made based on whether one or more criteria meets or exceeds a threshold. The criteria may be an amount of data received for sending, so that until the amount of data received for sending meets or exceeds a threshold, the determination at step 260 is that the data received is not to be sent. The data may be measured by an amount of bytes or an amount of times that data is separately received. Other criteria and corresponding thresholds may be used. For example, the measurement may be in terms of time, measured from when the first non-transmitted data is received. Until that amount of time meets or exceeds a threshold, none of the data received is sent. Other criteria may be used, or a function of a combination of these criteria and/or other criteria may be used. For example, the average rate of data may be computed so that the amount of time waiting, plus the amount of time chirping will cause, at the same data rate, an optimal amount of data to be available for sending at the end of the chirp period.

The thresholds used to queue the data may be fixed or they may be received as one or more of the parameters identified as a part of step 208 or as one or more parameters included as part of a data packet in step 244. The thresholds may be identified as part of step 208 using any manner of identifying parameters described herein, such as upon detection of a type or upon receipt or retrieval of a type.

In one embodiment, a device may identify or receive higher thresholds (e.g. those that would enable the device to wait longer upon receipt of an initial data packet to send) upon circumstances indicating that such device should conserve power, such circumstances being described above, while during other circumstances (e.g. the power is being received from line power, or a battery is not low or solar power is not being interrupted, etc.), the thresholds would be received or determined to be lower, so that data would be sent more frequently. The above embodiments are shown by the dashed line from the yes side of step 260 in the Figure.

In one embodiment, the wait occurs until the first of any such criteria is reached or a specified one of any such criteria is reached, or a combination of any such criteria is reached, at which point the process of sending data is initiated. Such details are illustrated by the solid line from the yes side of step 260 in FIG. 2B, which will now be described. In such embodiment, if a data packet is to be sent 260, then a timer is optionally set 262, and any additional data to be sent is received and stored 264. The timer may optionally be changed based on the amount of data pending transmission 266. When the timer expires 268, the method continues at step 272. Otherwise, so long as the timer has not expired 268, and less than the threshold amount of data has been collected 270, the method repeats at step 264, allowing additional data to be collected if any such data is to be sent. In one embodiment, the data threshold is not used, and step 268 is followed by step 264 if the timer has not expired, as shown by the dashed line in the Figure. In another embodiment, the timer is not used and step 270 follows step 264 or step 266 unconditionally.

The amount of data considered to be pending transmission, used for steps 266 or 272 may be altered based on a priority indication received with the data. An application that provides the data may include such a priority indication with the data. In such embodiment, the number of packets or amount of higher priority data may be multiplied by a certain factor corresponding to its priority, so that higher priority data will reach the data threshold faster than lower priority data, and/or pending higher priority data will decrease the timer value changed in step 266.

The amount of time to which the timer is set in steps 262 or 266 or the threshold amount of data or both may be identified in any of the manners described above for other parameters. This would include identifying such parameters based on a need to conserve power, for example, by detecting the type of power source being used to run the device, detecting or estimating an amount of power available to that device or available before more power will be made available, and/or detecting or estimating the amount of power being used by the device. The more power the device has, the lower the time and data thresholds.

In another embodiment, when setting its own thresholds, the device or the gateway will take into account the amount of power other devices have. For example, a device may receive in the chirp packet or a data packet from other devices an indication of whether those other devices have a need to conserve power. Because higher thresholds can serve to conserve power in the recipient device, a device that identifies other devices with which it is in communication have a need to conserve power, may increase the one or more thresholds it uses in response to such information. In another embodiment, the server collects such information and directs the devices to use thresholds appropriate to conserve the estimated amount of time the entire system can remain operational, or to conserve the operational time of certain high priority devices. Because longer thresholds can delay the transmission of data, the devices or server may attempt to keep the thresholds as short as possible, subject to operational issues such as ensuring operation until a certain time, such as when any of the devices running on a portable power source will be recharged, or when the sun is expected to provide solar power to battery-stored solar power devices.

At step 272, an offset time variable is initialized. As described herein, the offset time variable is initialized to zero, subtracted from the sleep period and the result is broadcast in the first chirp packet as the "time to data packet". The offset time variable is increased for each chirp packet as described in more detail below until the offset time variable reaches or exceeds the chirp period as described in more detail below, at which time the data packet is broadcast. Other embodiments may use a number of chirp packets (counted up or down) and optionally the time per chirp packet or other information that provides at least an approximate time that the data packet will be provided, instead of amounts of time, as the "time to data packet".

Broadcast Chirp Packet with Time to Data Packet

A chirp packet is wirelessly broadcast 274 with a chirp packet pattern and a time to data packet equal to the chirp period received in step 208, or most recently determined in response to a command, notification, or type determination as described herein, minus the current value of the offset variable, or other time to data packet identified in step 272. To broadcast the chirp packet, the radio and optionally other devices that may have been turned off or placed into a power-saving sleep mode are turned on or turned on to full power, a start frame delimiter is broadcast, followed by a chirp packet containing the chirp packet pattern, described above, and a time to data packet. In one embodiment, the period during which radios should remain on after receiving the data packet or the last data packet or piggybacked packet in order to receive any piggybacked packet or additional piggybacked packet is also broadcast with the chirp packet.

Increment Offset by One Chirp Interval, Wait

If the offset variable is not equal to or greater than the chirp period (or the number of packets remaining to be sent in the chirp period or is not equal to or less than zero) 276, then the offset variable is incremented 278 (or decremented in other embodiments). In one embodiment, the offset variable is incremented or decremented by one. In another embodiment, the offset variable is incremented/decremented by the time allowed to elapse between the start of sending of one chirp packet and the start of sending of the next. In one embodiment, the chirp interval is equal to the time it takes to broadcast a chirp packet, including the start frame delimiter, unless a command or notification has been received or a type determination has been made that would cause the chirp interval to be increased, as described herein and above.

As part of step 278, a determination is made as to whether the chirp interval has elapsed since the last chirp packet was broadcast (measured from the beginning or the end of the broadcast). If not 280, time is allowed to pass until the chirp interval elapses 282. Time may be allowed to pass by setting a timer for the corresponding amount of time, or by monitoring a counter or another timing device. During this time, the radio, and/or other devices may be placed into a power saving sleep mode as part of step 282. Increasing the chirp interval causes the device to send fewer chirp packets, thereby using less power. When the chirp interval has elapsed 282, the method continues at step 274.

Broadcast Data

If the offset time variable is greater than or equal to the chirp period (or less than or equal to zero) 276, one or more data packets are broadcast 290 wirelessly via the radio, and the method continues at step 260. In one embodiment, the offset time variable is greater than or equal to the length of the chirp period (or less than or equal to zero) when or after the broadcast time to data packet is reached; thus, the data packets are broadcast as advertised in the chirp packet, or slightly afterwards.

In one embodiment, as described above, the chirp packet not only contains the information described above, it also contains the size of the data packet or data packets that will be broadcast or the amount of time it will take to broadcast the packet or packets. This allows devices that do not wish to receive the packet advertised in the chirp packet to delay powering up radios to receive other piggybacked packets until the advertised data packet has been sent, as calculated by the end of the chirp interval, plus an amount of time to receive the specified amount of data or the indicated amount of time.

Summary of Parameter Determination

The parameters used for transmission, receipt or storage of chirp packets and data packets to be used by a device may not only be determined by the device in response to its own determination of what the parameters should be, for example, because such parameters are stored or identified in response to a determination related to available power, they can be determined by the devices responding to information they have received from other devices, such as type information, which may indicate power available or predicted to be available to the device, or by parameters they have received from other devices. A server can collect any of this information from the various devices and then identify optimal parameters for some or all of the devices and provide it to them.

FIG. 2C is a flowchart illustrating a method of identifying parameters according to one embodiment of the present invention. This method may be performed by a device or by the server. Parameters and/or power or other type information is received 291 from multiple devices by a server or other device. Proximity of the devices to the other device or of the devices to one another is determined 292. In the case of the server, a first device is selected 293. If the selected device's parameters (or in the case of the device performing the method, if the device's parameters) are to be determined as a function of the other devices (e.g. the device or selected device is not using line power) 294, the method continues at step 295, and otherwise 294, the method continues at step 297.

It is noted that devices other than a device for which it is desirable to conserve power may have their parameters changed in order to allow the devices for which it is desirable to conserve power to use less power. This may be done instead of, or in addition to, altering the parameters of the devices for which it is desirable to conserve power.

At step 295, the parameters or type information, which may be related to power, of at least some of the devices is used to determine parameters of the other device, and the parameters are provided and received and/or used by the other device, to transmit or receive chirp and/or data packets and/or to determine thresholds used to identify when collected data should be sent 296. The method continues at step 297 in the case of the server performing the method, or step 291 in the case of the device performing the method.

At step 297, if there are more unselected devices, the next device is selected 298 and the method continues at step 294 using the newly selected device. Otherwise 297, the method continues at step 291.

Certain devices can be designated high priority devices, or certain devices can determine that they have become high priority devices, and can serve to define their own parameters independently of the other devices, or independently of the low priority devices. For example, devices running on battery power, or devices that have determined they are running low on battery power or that they may not have enough to continue operation as long as they may need would consider themselves higher priority devices. Lower priority devices, such as those running on line power, can adapt to the needs of the other devices. A server can direct some or all of this activity, directing the high priority devices to use parameters biased towards conserving their power, while directing other devices to adapt to those parameters, using parameters that will cause such devices to use more power.

It is noted that high priority could include a factor different from power availability. For example, transmissions or receipt of transmissions of some battery powered devices may be more critical than transmissions or receipt of transmissions of other battery power devices. Each device can check its type or characteristics or both and can determine whether to respond to parameters of other devices or set their own parameters according to their needs.

System

Figure 3:
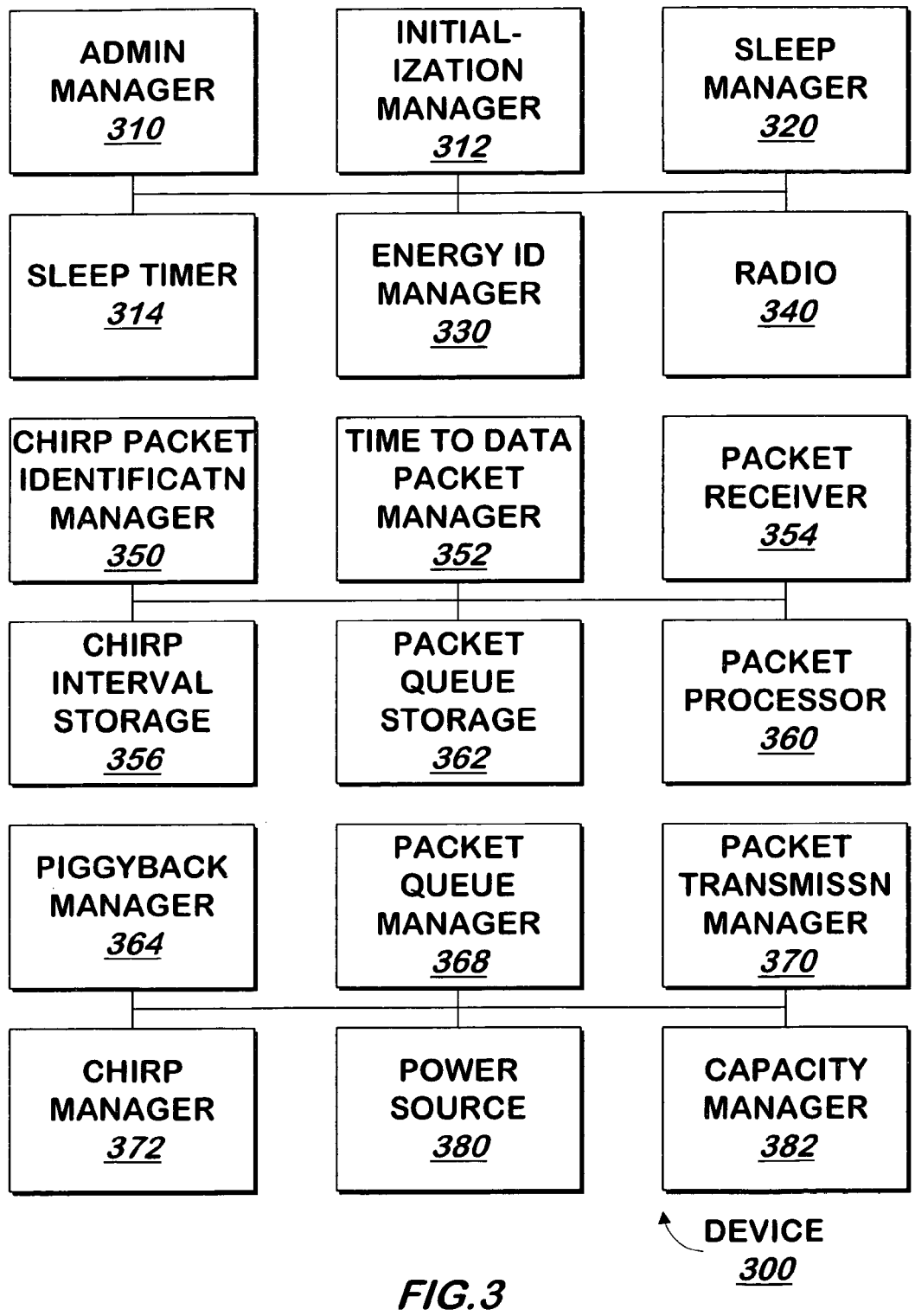
FIG. 3 is a block schematic diagram of a system for receiving and sending packets in a manner that conserves power according to one embodiment of the present invention.

FIG. 3 is a block schematic diagram of a system for receiving and sending packets in a manner that conserves power according to one embodiment of the present invention. Referring now to FIG. 3, administration manager 310 identifies parameter information, frequency information and optionally, address information and the period during which the radio should remain on following receipt of a data packet (the "piggyback period"), as described above. Such information may be stored in a ROM (not shown) coupled to administration manager 310, or may be received via radio 340, described in more detail below. Such information can be received as type information, which administration manager 310 uses to identify the parameters, or administration manager 310 may identify a type by sensing other information as described above. In one embodiment, administration manager 310 contains any or all of a voltage sensor, a battery sensor, a clock, or other information useful in identifying the type as described above.

Administration manager 310 may identify parameters by receiving messages from radio 340 sent by other devices describing their parameters, and may determine the parameters in response to those parameters, as well as any or all of a message received via radio 340 from a gateway indicating a priority or type, or via a priority or type stored by administration manager 340 or stored in a ROM, or upon determination of a type or one or more other characteristics, such as low voltage or power or time of day, and optionally proximity of other devices determined in response to messages received by administration manager 310 from such other devices via radio 340. In one embodiment, such messages are sent to administration manager 340 by radio.

Administration manager 310 provides the parameters, frequency or frequencies and any address or addresses and the piggyback period to initialization manager 312.

When initialization manager 312 receives the parameters, frequency information and any address information from administration manager 310, it initializes the frequency and optionally, the address settings of radio 340 to instruct radio 340 to receive communications at the proper frequency or frequencies and addresses, as described above, and initialization manager 312 provides the sleep period and listening window to sleep manager 320. Initialization manager 312 provides the chirp period and chirp interval to chirp transmission manager 372.

It is noted that not all parameters need be provided by administration manager 310 and initialization manager 312 as described, as default values may be stored by the devices that receive such parameters and may be used until a different such parameter is received.

Administration manager 310 may continuously monitor type, characteristics, and communications and identify parameters in response as described above. As administration manager 310 identifies different parameters, administration manager 310 provides them to initialization manager 312, which provides them as described above.

Radio 340 is a conventional wireless radio capable of transmission and reception of bits or packets. In one embodiment, radio 340 includes a conventional ChipCon CC2420 commercially available from ChipCon, of Oslo, Norway, and details of the CC2420 are available at the web site of chipcon.com/index.cfm?kat_id=2&subkat_id=12&dok_id=115. Other embodiments may use the conventional MC13203 commercially available from Freescale, Inc, of Austin Tex. or other conventional radios. Radio 340 uses the frequency and any addresses it receives to receive packets over that frequency, and optionally addressed to that address. As noted, an address is not necessary, as radio 340 may receive any packet from the frequency if desired.

Radio 340 may include control logic either built into radio or external to radio that manages the various requests from different devices to change power levels, preferring the higher power command, retaining an old power level and returning to the prior power level after the command is received to turn the radio off or otherwise reduce its power, until a command to reduce the power level further is received from the device that provided the command to turn the radio up to the previous power level. For example, if the radio is at full power, and then a command is received to wake the radio up and operate at a partial power level, the radio will remain at full power until the command is received to put the radio into a sleep mode, at which point the radio will operate at the partial power level until the command is received to put the radio into sleep mode.

When sleep manager 320 receives the sleep period and listening window from initialization manager 312, it stores the sleep period and listening window internally, instructs radio 340 to enter sleep mode, and initiates sleep timer 314 to the length of the sleep period. As described herein, sleep timer 314 is a timer monitored by sleep manager 320. However, in other embodiments, sleep timer 314 may be a timer that is monitored by radio 340, or sleep timer 314 may be a conventional timer built into and monitored by the operating system (not shown). In such embodiment, operating system may provide an interrupt to sleep manager 320, radio 340 or both when the amount of time received, has elapsed.

Sleep manager 320 monitors sleep timer 314, as described above, until the sleep period has elapsed. When sleep manager 320 determines that the sleep period has elapsed, sleep manager 320 may signal energy identification manager 330 with the listening window. In another embodiment, instead of signaling energy identification manager 330, sleep manager 320 may signal radio 340 to power on, as described in more detail below, for the amount of time of the listening window. In such embodiment, energy identification manager 330 need not be used.

In the embodiment in which energy identification manager 330 is used, when energy identification manager 330 receives the listening window from sleep manager 320, it retrieves (e.g. from the operating system, not shown) and retains the current time as the start of the listening window, and receives an indication of the energy on the frequency. In one embodiment, to receive the indication of energy on the frequency, energy identification manager 330 requests radio 340 to turn on and identify energy on the frequency. (In another embodiment, sleep manager 320 turns radio on and energy identification manager requests radio to identify energy on the frequency one of the frequencies or any of the frequencies.) In one embodiment, the power required by the radio to accomplish this task is lower than the power required to receive a minimum length packet and in another embodiment, the amount of power is similar or the same as that required to receive a minimum length packet such as a chirp packet. In either case, it is higher than the sleep mode of the radio. In one embodiment, the sleep mode of the radio causes it to draw more power than it would if it were powered down or turned off, and in another embodiment, the sleep mode turns the radio off. In one embodiment, energy identification manager 330 has the radio determine whether such energy is on the frequency or frequency until the listening window ends, or until the energy on the frequency or one of the frequencies exceeds the threshold described herein, whichever occurs first. In another embodiment, energy identification manager 330 receives the indication, and if no energy is on the channel, energy identification manager 330 instructs radio 340 to turn off for an amount of time less than one chirp period and then again requests radio 340 to turn on and identify energy on the frequency or any of the frequencies. Energy identification manager 330 repeats this process until the end of the listening window or until energy is indicated as being on the frequency, above a threshold.

If energy identification manager 330 receives an energy level indication from radio 340 above a certain threshold, as described above, it signals radio 340 to fully awaken, if it is not already fully awake, and receive a stream of bits for as long as bits are received.

When radio 340 receives a signal to receive, it turns on to full power, if it is not already at full power, and attempts to receives a stream of bits as described above. If radio 340 receives any bits, it streams the bits to chirp packet identification manager 350.

If radio 340 does not receive any bits, radio 340 so indicates to energy identification manager 330. Energy identification manager 330 receives the indication and either directs radio to continue to attempt to stream bits to chirp packet identification manager 350, repeating the attempts until the end of the listening window in one embodiment, or it signals sleep manager 320 in another embodiment.

When chirp packet identification manager 350 receives the stream of bits, it determines whether the stream of bits includes a chirp packet pattern, as described above. In another embodiment, radio 340 itself may scan for the chirp packet pattern. In one embodiment, either chirp packet identification manager 350 or radio 340 also scans for a start frame delimiter.

If chirp packet identification manager 350, or radio 340, does not identify a chirp packet pattern, or chirp packet pattern and start frame delimiter, chirp packet identification manager 350 or radio 340 signals sleep manager 320 to instruct the radio to sleep for the sleep period, as described above, and sleep manager 320 complies, as described above.

As noted above, the stream of bits may in fact be a data packet. In one embodiment, chirp packet identification manager 350 may check for such a data packet as described above. If at least some of the data packet is identified, chirp packet identification manager 350 may receive the remainder of the packet, if any, and provide the data packet to packet receiver 354 for storage and use as described below.

If chirp packet identification manager 350 or radio 340 does identify a chirp packet pattern in the stream of bits, it sends the stream of bits to time to data packet manager 352.

When time to data packet manager 352 receives the stream of bits from chirp packet identification manager 350, it identifies the time to data packet and determines the amount of time at which the radio should be turned on as described above, and optionally identifies the piggyback period as well. When time to data packet manager 352 has identified the amount of time at which the radio should be turned on, and optionally, the piggyback period, it signals sleep manager 320 with the amount of time, as described above. As noted, the time to data packet may describe a number of chirp packets remaining to be broadcast or another such number from which the amount of time remaining until the data packet can be derived. In such embodiment, time to data packet manager 352 performs such derivation to identify an actual time, and provides this time to sleep manager 320.

When sleep manager 320 is signaled with the amount of time at which the radio should be turned on, it instructs radio 340 to sleep until the amount of time has been reached. In one embodiment, sleep manager 320 instructs radio 340 to sleep, initiates sleep timer 314 to the time to data packet and monitors, or receives an interrupt from, sleep timer 314 until the time to data packet has been reached, as described above. When the time to data packet has been reached, sleep manager 320 signals packet receiver 354 to begin receiving the data packet or data packets.

When packet receiver 354 receives a signal from sleep manager 320, it retrieves the current date and time, and attempts to receive one or more data packets from radio 340. In one embodiment, packet receiver 354 attempts to receive one or more data packets by instructing radio 340 to wake up to full power, receive one or more data packets, and provide the data packet(s) to packet receiver 354. Radio 340 complies with such instruction. If packet receiver 354 has not received any data packets, packet receiver 354 signals piggyback manager 364 with the date and time it woke the radio up. If packet receiver 354 has received one or more data packets from radio 340, it retrieves the current date and time, provides the data packet or packets to packet processor 360 and signals piggyback manager 364 with an indication as to whether any packets were received, optionally, with the date and time it received the data packet. In one embodiment, packet receiver 354 will only provide the date and time for the first packet received from sleep manager 320, in which case there is only one piggyback period after the sleep period ends, and in another embodiment, there may be any number of piggyback periods, each one starting after a packet is received, until no more piggybacked packets are sent. In still another embodiment, there is a maximum number of piggyback periods.

When packet processor 360 receives one or more data packets, it processes the data packet(s). In one embodiment, packet processor 360 processes the received data packet(s) in any conventional manner, as described above. In one embodiment, packet processor 360 performs any of the packet processing functions described above, such as determining and maintaining proximity of other devices from which messages are received, forwarding packets identifying a type of the device containing packet processor 360 or forwarding such messages to administration manager 310 or identifying the parameters based on such messages and a priority that packet processor 360 receives or otherwise maintains as described above. Packet processor 360 communicates information to administration manager 310 as such information changes or at other times.

At any time, packet processor 360 may provide packets to packet queue manager 368 for storage into packet queue storage 362 to be broadcast. Such packets may be received from applications performing data collection and/or processing functions and providing information to a gateway or other device. As packets are provided, they may be time stamped by packet queue manager 368 with the date and time of receipt, which is stored in packet queue storage 362 with each packet, or with the first packet stored after the queue is determined to be empty. In one embodiment, the size of each packet is also stored in packet queue storage 362 with the packet by packet queue manager 368. When signaled, piggyback manager 364 determines whether there are one or more data packets in the packet queue in packet queue storage 362.

When piggyback manager 364 is signaled, piggyback manager 364 provides the one or more data packets from packet queue storage 362 to radio 340 and signals radio 340 to broadcast the one or more data packets. In one embodiment, piggyback manager 364 retrieves the one or more data packets from packet queue storage 362 using pointers to the head and tail of the queue, adjusting the head pointer as packets are retrieved. Radio 340 broadcasts as described above the one or more packets over the frequency, optionally using the address it received as described-above. When radio 340 has finished broadcasting the one or more data packets, radio 340 signals piggyback manager 364. If the indication from packet receiver 354 indicates that one or more packets are received, piggyback manager 364 again signals packet receiver 354, which repeats the process as described above as many times as required, including signaling piggyback manager 364 with the indication as to whether one or more packets were received. If the indication indicates that no packets were received, and there are no packets to be sent from packet queue storage 364, piggyback manager 364 signals sleep manager 320 to initiate the sleep period and monitor the timer, repeating the process of receiving packets as described above.

In one embodiment, piggyback manager 364 will put the radio to sleep only after the end of the piggyback period, which it retrieves from initialization manager 312 or data packet manager 352, the piggyback period being measured from the date and time the last data packet was received or the date and time the radio was turned on but no packet was received. During such time, the radio may continue to receive piggybacked packets from other devices, of which there may be any number, and radio will provide such packets to packet receiver 354 for processing as described above. In one embodiment, piggyback manager 364 will put the radio to sleep no later than the end of the first piggyback period, even if additional packets are available to be sent by piggyback manager 364. The piggyback period may be the maximum back off period, plus the amount of time required to send the maximum length packet.

In one embodiment, following the end of any given sleep period, if energy identification manager 330 receives an energy level below the threshold, indicating that no packet is to be received, as described above, instead of signaling sleep manager 320, energy identification manager 330 signals packet transmission manager 370 to check the packet queue in packet queue storage 314 for any data packets. In the embodiment in which energy identification manager 330 is not used, instead of signaling sleep manager 320, chirp packet identification manager 350 signals packet queue manager 368 to check the packet queue in packet queue storage 314 for any data packets, if chirp packet identification manager 350 receives the indication that no bits were received, or chirp packet identification manager 350 determines that the packet is not a chirp packet, or chirp packet identification manager 350 determines that the packet is not a chirp packet or data packet. Alternatively, packet transmission manager 370 may operate independently of such other elements, in which case it uses an operating system timer to periodically signal it.

When packet queue manager 368 receives the signal from energy identification manager 330, chirp packet identification manager 350 or the operating system timer, packet queue manager 368 determines whether there are any packets in the packet queue in packet queue storage 362. If packet queue manager 368 determines that there are no data packets in the packet queue in packet queue storage 362, packet queue manager 368 signals sleep manager 320 to initiate a timer for the duration of the sleep period or a different period of time, such as one much shorter than the sleep period, and repeat the process of receiving packets as described above. However, if packet queue manager 368 identifies one or more data packets in packet queue storage 362, it signals chirp transmission manager 372, which initiates the series of chirps and the transmission of the packets in the packet queue. It is not necessary that packets be transmitted or received in the packet queue, as portions of packets or other data structures may be received. All data structures capable of transmission are referred to as "packets" herein.

In one embodiment, packet queue manager 368 will wait to signal chirp transmission manager 368 until the number of packets in the packet queue in packet queue storage 360 reaches or exceeds a threshold number, or the total size of the packets reaches a threshold size, or the amount of time from the time the first packet has been in the queue reaches a threshold amount of time as compared with the current time, which packet queue manager 368 retrieves from an operating system clock (not shown) or any combination of these characteristics and/or other characteristics.

The thresholds may be identified as parameters by administration manager 310 using any of the methods identified herein, and provided to packet queue manager 368 by initialization manager 312 as described above, having received them from administration manager 310. The methods of identifying the thresholds may include identification of the thresholds by retrieving them locally, receiving a type locally and translating the type into the thresholds, identifying a type or the thresholds based on detected characteristics of the environment corresponding to (e.g. surrounding) the device using one or more detectors that are part of administration manager 310. The thresholds may be identified by receiving them via packet processor 360, or by receiving a priority and/or type of the device containing packet transmission manager and looking the thresholds up from a list stored internally to packet queue manager 368, or by receiving the types or parameters (thresholds or other parameters) of other devices and identifying the thresholds based on such other types or parameters. For example, if another device in proximity with the device containing packet queue manager 368 reports that it is low on battery power, packet queue manager 368 may increase the thresholds, based on the number of other devices reporting such status, up to a maximum. A gateway can collect or deduce (by watching operation of other devices) the types or parameters of other devices and provide an instruction to the device containing packet queue manager 368 to change the thresholds, optionally along with other parameters to packet processor 360 via radio 340 and packet processor 360 provides the thresholds to packet queue manager 368, via administration manager 310 and initialization manager 312.

It is noted that other devices may operate the same as or similarly to the device containing packet transmission manager 370, including containing their own packet transmission managers.

When chirp transmission manager 372 receives the signal from packet transmission manager 370, chirp transmission manager 372 broadcasts a series of chirp packets for the chirp period, optionally spacing them according to the chirp interval, as described above, each chirp packet containing a chirp packet pattern and a different time to data packet from the chirp packet before it, in the manner described above. In one embodiment, chirp transmission manager 372 may initiate a time offset variable to zero, as described above, and store the offset variable internally. Chirp transmission manager 372 receives the chirp period and chirp interval from initialization manager 312, calculates time to data packet (which may be a countdown or countup time or a number of chirp packets remaining or sent), in the manner described above, and broadcasts via radio 340 each chirp packet containing the chirp packet pattern and the time to data packet, incrementing (or decrementing) and storing the offset variable in the manner described above at each chirp broadcast, until the time to data packet has been reached or exceeded. When chirp transmission manager 372 determines that the time to data packet has been reached or exceeded, in the manner described above, it signals packet transmission manager 370 to broadcast the one or more data packets, or portions thereof, in packet queue storage 362.

When packet transmission manager 370 receives the signal from chirp transmission manager 372 to broadcast the one or more data packets in packet queue storage 362, packet transmission manager 370 provides the packet or packets or portions thereof in the packet queue in packet queue storage 362 to radio 340 and signals radio 340 to broadcast the one or more packets. When radio 340 has finished broadcasting the one or more packets, packet transmission manager 370 signals packet receiver 354 to repeat the process described above.

As described herein, communication via the radio 340 is performed wirelessly. However, the present invention may also be used with other means of communication, such as wired communications or fiber optics over a conventional network. In such embodiment, a network interface may be used instead of, or in addition to, the radio.

What is claimed is:

1. A method comprising:
   receiving, at a receiver node, a chirp packet transmitted by a source node;
   examining, by the receiver node, information included in the chirp packet;
   based on information included in the chirp packet, turning on, by the receiver node, a radio associated with the receiver node at a time indicated by the information included in the chirp packet for transmission of a data packet by the source node;
   monitoring, by the receiver node and using the radio, the channel for reception of other data packets for a time period that is longer than an expected length of time that is indicated by the information included in the chirp packet for transmission of the data packet; and
   receiving, by the receiver node, another data packet that is transmitted by another source node at a time during the time period after expiry of the expected length of time for transmission of the data packet by the source node, the another data packet being transmitted without a chirp packet.

2. The method of claim 1, wherein the time period for monitoring the channel is configured to be longer than a maximum back off period following reception of the another data packet, such that other data packets that may have been transmitted by other sources may be received.

3. The method of claim 1, further comprising:
   receiving, at a source node, packets for transmission in a communications network, the packets including a chirp packet that indicates a later instant in time when a data packet will be transmitted by the source node;
   buffering, by the source node, the packets till at least one measurable quantity meets a predetermined threshold, at which time transmission is performed;
   determining, by the source node, whether at least one measurable quantity has achieved the predetermined threshold; and
   based on determining that at least one measurable quantity has achieved the predetermined threshold, transmitting, by the source node and over a channel in the communications network, the packets.

4. The method of claim 3, wherein the at least one measurable quantity is:
   one or more of an amount of time since a first packet was received, a number of data elements received for transmission, or
   an amount of data received for transmission.

5. The method of claim 3, comprising:
   determining, by the source node, whether the receiver node that is intended as a recipient for the packets is a power-constrained device; and
   based on determining that the receiver node is a power-constrained device, decreasing, by the source node, a number of the packets that are transmitted based on at least one of:
   increasing a value of the predetermined threshold such that a time associated with buffering the packets is increased,
   increasing a length of a chirp period that corresponds to a time interval during which the packets are transmitted, and
   decreasing a frequency at which the packets are transmitted.

6. The method of claim 5, wherein a power-constrained device includes a network node that is operating on battery power or other portable power.

7. The method of claim 5, comprising:
   identifying, by at least one of the source node and the receiver node, parameters corresponding to transmission or reception of communications between the source node and the receiver node, the parameters including at least one of:
   a sleep period that indicates a time interval during which the source node and the receiver node are to awaken at least once to listen for a chirp packet on the channel or to measure a level of energy on the channel, wherein the sleep period of the receiver node is set to a value that is not greater than a minimum chirp period associated with the source node,
   the chirp period,
   a chirp interval that indicates a total amount of time for which a chirp packet is transmitted, including a downtime between transmitting chirp packets, wherein the source node is configured to operate in a reduced power mode between chirp intervals, a listening window that indicates a time interval during which a radio of the receiver node is configured to be on such that a chirp packet transmitted by the source node is received, and channel information that includes at least one of a frequency channel and a logical channel over which the source node transmits packets to the receiver node.

8. The method of claim 7, wherein information included in a chirp packet comprises at least one of:

a chirp packet pattern that includes a recognizable pattern of bits in a predetermined portion of the chirp packet and configured to identify the chirp packet, a time to data packet that includes bits in the chirp packet indicating a time interval starting from a time associated with a predetermined section of the chirp packet, after expiry of which a data packet will be transmitted, an expected length of time for transmission of the data packet following the chirp packet, a number of data packets to be transmitted following transmission of chirp packets, and information associated with the parameters corresponding to transmission or reception of communications between the source node and the receiver node.

9. A system comprising:

a source node including first instructions that are encoded in a non-transitory computer-readable first medium for execution by a first processor and configured to cause the first processor to perform operations comprising:

receiving, by the source node, packets for transmission to a receiver node in a communications network, the packets including a chirp packet indicating a later instant in time when a data packet will be transmitted by the source node;

buffering, by the source node, the packets till at least one measurable quantity meets a predetermined threshold, at which time transmission is performed;

determining, by the source node, whether at least one measurable quantity has achieved the predetermined threshold; and based on determining that at least one measurable quantity has achieved the predetermined threshold, transmitting, by the source node and over a channel in the communications network, the packets; and a receiver node including second instructions that are encoded in a non-transitory computer-readable second medium for execution by a second processor and configured to cause the second processor to perform operations comprising:

receiving, at the receiver node, the chirp packet transmitted by the source node;

examining, by the receiver node, information included in the chirp packet;

based on information included in the chirp packet, turning on, by the receiver node, a radio associated with the receiver node at a time indicated by the information included in the chirp packet for transmission of a data packet by the source node;

monitoring, by the receiver node and using the radio, the channel for reception of other data packets for a time period that is longer than an expected length of time that is indicated by the information included in the chirp packet for transmission of the data packet; and receiving, by the receiver node, another data packet that is transmitted by another source node at a time during the time period after expiry of the expected length of time for transmission of the data packet by the source node, the another data packet being transmitted without a chirp packet.

10. The system of claim 9, wherein the at least one measurable quantity is selected from a group comprising:

one or more of an amount of time since a first packet was received, a number of data elements received for transmission, and an amount of data received for transmission.

11. The system of claim 9, wherein the first instructions are configured to cause the first processor to perform operations comprising:

determining, by the source node, whether the receiver node is a power-constrained device; and based on determining that the receiver node is a power-constrained device, decreasing, by the source node, a number of the packets that are transmitted based on at least one of:

increasing a value of the predetermined threshold such that a time associated with buffering the packets is increased, increasing a length of a chirp period that corresponds to a time interval during which the packets are transmitted, and decreasing a frequency at which the packets are transmitted.

12. The system of claim 11, wherein a power-constrained device includes a network node that is operating on battery power or other portable power.

13. The system of claim 11, wherein the first instructions and the second instructions include instructions that are configured to cause the respective first processor and the second processor to perform operations comprising:

identifying, by at least one of the source node and the receiver node, parameters corresponding to transmission or reception of communications between the source node and the receiver node, the parameters including at least one of:

a sleep period that indicates a time interval during which the source node and the receiver node are to awaken at least once to listen for a chirp packet on the channel or to measure a level of energy on the channel, wherein the sleep period of the receiver node is_set to a value that is not greater than a minimum chirp period associated with the source node, the chirp period, a chirp interval that indicates a total amount of time for which a chirp packet is transmitted, including a downtime between transmitting chirp packets, wherein the source node is configured to operate in a reduced power mode between chirp intervals, a listening window that indicates a time interval during which a radio of the receiver node is configured to be on such that a chirp packet transmitted by the source node is received, and channel information that includes at least one of a frequency channel and a logical channel over which the source node transmits packets to the receiver node.

14. The system of claim 13, wherein information included in a chirp packet comprises at least one of:

a chirp packet pattern that includes a recognizable pattern of bits in a predetermined portion of the chirp packet and configured to identify the chirp packet, a time to data packet that includes bits in the chirp packet indicating a time interval starting from a time associated with a predetermined section of the chirp packet, after expiry of which a data packet will be transmitted,
an expected length of time for transmission of the data packet following the chirp packet,
a number of data packets to be transmitted following transmission of chirp packets, and
information associated with the parameters corresponding to transmission or reception of communications between the source node and the receiver node.

15. The system of claim 9, wherein the time period for monitoring the channel is configured to be longer than a maximum back off period following reception of the another data packet, such that other data packets that may have been transmitted by other sources may be received.

16. A computer program product, embodied in a non-transitory computer-readable medium storing software comprising instructions executable by one or more computers, which, upon such execution, cause the one or more computers to perform operations comprising:
receiving, at a receiver node in a communications network, a chirp packet transmitted by a source node, the chirp packet indicating a later instant in time when a data packet will be transmitted by the source node;
examining, by the receiver node, information included in the chirp packet;
based on information included in the chirp packet, turning on, by the receiver node, a radio associated with the receiver node at a time indicated by the information included in the chirp packet for transmission of the data packet by the source node;
monitoring, by the receiver node and using the radio, the channel for reception of other data packets for a time period that is longer than an expected length of time that is indicated by the information included in the chirp packet for transmission of the data packet; and
receiving, by the receiver node, another data packet that is transmitted by another source node at a time during the time period after expiry of the expected length of time for transmission of the data packet by the source node, the another data packet being transmitted without a chirp packet.

17. The computer program product of claim 16, wherein the time period for monitoring the channel is configured to be longer than a maximum back off period following reception of the another data packet, such that other data packets that may have been transmitted by other sources may be received.

18. The computer program product of claim 16, further comprising:
receiving, at a source node, packets for transmission in a communications network, the packets including a chirp packet that indicates a later instant in time when a data packet will be transmitted by the source node;
buffering, by the source node, the packets till at least one measurable quantity meets a predetermined threshold, at which time transmission is performed;
determining, by the source node, whether at least one measurable quantity has achieved the predetermined threshold; and
based on determining that at least one measurable quantity has achieved the predetermined threshold, transmitting, by the source node and over a channel in the communications network, the packets.

19. The computer program product of claim 18, wherein the at least one measurable quantity is:
one or more of an amount of time since a first packet was received, a number of data elements received for transmission, or
an amount of data received for transmission.

20. The computer program product of claim 18, wherein the instructions cause the one or more computers to perform operations comprising:
determining, by the source node, whether the receiver node that is intended as a recipient for the packets is a power-constrained device; and
based on determining that the receiver node is a power-constrained device, decreasing, by the source node, a number of the packets that are transmitted based on at least one of:
increasing a value of the predetermined threshold such that a time associated with buffering the packets is increased,
increasing a length of a chirp period that corresponds to a time interval during which the packets are transmitted, and
decreasing a frequency at which the packets are transmitted.

21. The computer program product of claim 20, wherein a power-constrained device includes a network node that is operating on battery power or other portable power.

22. The computer program product of claim 18, wherein the instructions cause the one or more computers to perform operations comprising:
identifying, by the source node, parameters corresponding to transmission or reception of communications between the source node and the receiver node, the parameters including at least one of:
a sleep period that indicates a time interval during which the source node and the receiver node are to awaken at least once to listen for a chirp packet on the channel or to measure a level of energy on the channel, wherein the sleep period of the receiver node is set to a value that is not greater than a minimum chirp period associated with the source node,
the chirp period,
a chirp interval that indicates a total amount of time for which a chirp packet is transmitted, including a downtime between transmitting chirp packets, wherein the source node is configured to operate in a reduced power mode between chirp intervals,
a listening window that indicates a time interval during which a radio of the receiver node is configured to be on such that a chirp packet transmitted by the source node is received, and
channel information that includes at least one of a frequency channel and a logical channel over which the source node transmits packets to the receiver node.

23. The computer program product of claim 18, wherein information included in a chirp packet comprises at least one of:
a chirp packet pattern that includes a recognizable pattern of bits in a predetermined portion of the chirp packet and configured to identify the chirp packet,
a time to data packet that includes bits in the chirp packet indicating a time interval starting from a time associated with a predetermined section of the chirp packet, after expiry of which a data packet will be transmitted,
an expected length of time for transmission of the data packet following the chirp packet,
a number of data packets to be transmitted following transmission of chirp packets, and
information associated with the parameters corresponding to transmission or reception of communications between the source node and the receiver node.

* * * * *